US009148609B2

(12) United States Patent
Shintani et al.

(10) Patent No.: US 9,148,609 B2
(45) Date of Patent: Sep. 29, 2015

(54) PASS THROUGH OF REMOTE COMMANDS

(75) Inventors: Peter Rae Shintani, San Diego, CA (US); Tohru Doumuki, San Diego, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 2205 days.

(21) Appl. No.: 11/894,505

(22) Filed: Aug. 21, 2007

(65) Prior Publication Data

US 2009/0051650 A1 Feb. 26, 2009

(51) Int. Cl.
*H04N 21/4363* (2011.01)
*H04N 21/443* (2011.01)
*H04N 5/44* (2011.01)
*H04N 21/422* (2011.01)

(52) U.S. Cl.
CPC ....... *H04N 5/4403* (2013.01); *H04N 21/42221* (2013.01); *H04N 21/43632* (2013.01); *H04N 21/43635* (2013.01); *H04N 21/4436* (2013.01); *G08C 2201/40* (2013.01)

(58) Field of Classification Search
USPC .......................................................... 348/734
See application file for complete search history.

(56) References Cited

U.S. PATENT DOCUMENTS

| | | | |
|---|---|---|---|
| 7,199,706 B2 | 4/2007 | Dawson et al. | |
| 2003/0007103 A1* | 1/2003 | Roy | 348/731 |
| 2004/0155809 A1* | 8/2004 | Eyer | 341/176 |
| 2006/0165054 A1 | 7/2006 | Iwamura | |
| 2006/0187023 A1 | 8/2006 | Iwamura | |
| 2007/0003288 A1 | 1/2007 | Tong et al. | |
| 2007/0169153 A1* | 7/2007 | Zhang | 725/80 |
| 2007/0286600 A1* | 12/2007 | Guo et al. | 398/43 |

OTHER PUBLICATIONS

"High-Definition Multimedia Interface, Specification Version 1.3", Jun. 22, 2006, HDMI Licensing, LLC, CEC Supplement 1 pp. 5, 32 and 33.*

* cited by examiner

*Primary Examiner* — Nathan Flynn
*Assistant Examiner* — Omar S Parra
(74) *Attorney, Agent, or Firm* — John L. Rogitz

(57) ABSTRACT

In one embodiment, a television set having remote control signaling to a controlled device has a data communication interface for communication of data, said data communication interface having a connection reserved for DC power. A remote control interface that receives commands from a remote control device. A circuit determines whether a command received at the remote control interface is destined for the television set or for the controlled device. The controlled device is connected to the television set via the data communication interface. A modulator modulates a signal representing a command destined for the controlled device onto the DC power connection in order to convey the command to the controlled device. In another embodiment a television accessory device that is interconnected to and controllable by the television has a data communication interface for communication of data, said data communication interface having a connection reserved for DC power. The accessory device is connected to the television via the data communication interface. A demodulator is coupled to the DC power connection and demodulates a signal representing a command that is modulated onto the DC power connection in order to receive a command from the television. A processor implements the command in the accessory device. This abstract is not to be considered limiting, since other embodiments may deviate from the features described in this abstract.

34 Claims, 2 Drawing Sheets

PASS THROUGH OF REMOTE COMMANDS

COPYRIGHT AND TRADEMARK NOTICE

A portion of the disclosure of this patent document contains material which is subject to copyright protection. The copyright owner has no objection to the facsimile reproduction of the patent document or the patent disclosure, as it appears in the Patent and Trademark Office patent file or records, but otherwise reserves all copyright rights whatsoever. Trademarks are the property of their respective owners.

BACKGROUND

Set Top Boxes (STBs) or Set Back Boxes (SBBs) are usually shipped with an Infra Red (IR) remote controller to control the STB/SBB. However, the physical location of the STB/SBB may be such that its IR receiver may not be in a direct line of sight of an IR transmitter of the remote controller (e.g., the user may desire to hide a STB from sight). Reliable communication using infrared signaling generally requires a direct path of light between the transmitter and the receiver (although communication can be carried out via repeaters or via reflected light. If there is no good path for the transmission of light, this might result in an unreliable operation the STB or SBB or inability of the remote controller to control the STB or SBB. The terms STB and SBB, while representing different physical devices, relate to devices serving similar purposes and can be used interchangeably for purposes of the present discussion.

BRIEF DESCRIPTION OF THE DRAWINGS

Certain illustrative embodiments illustrating organization and method of operation, together with objects and advantages may be best understood by reference detailed description that follows taken in conjunction with the accompanying drawings in which.

DETAILED DESCRIPTION

Figure 1:
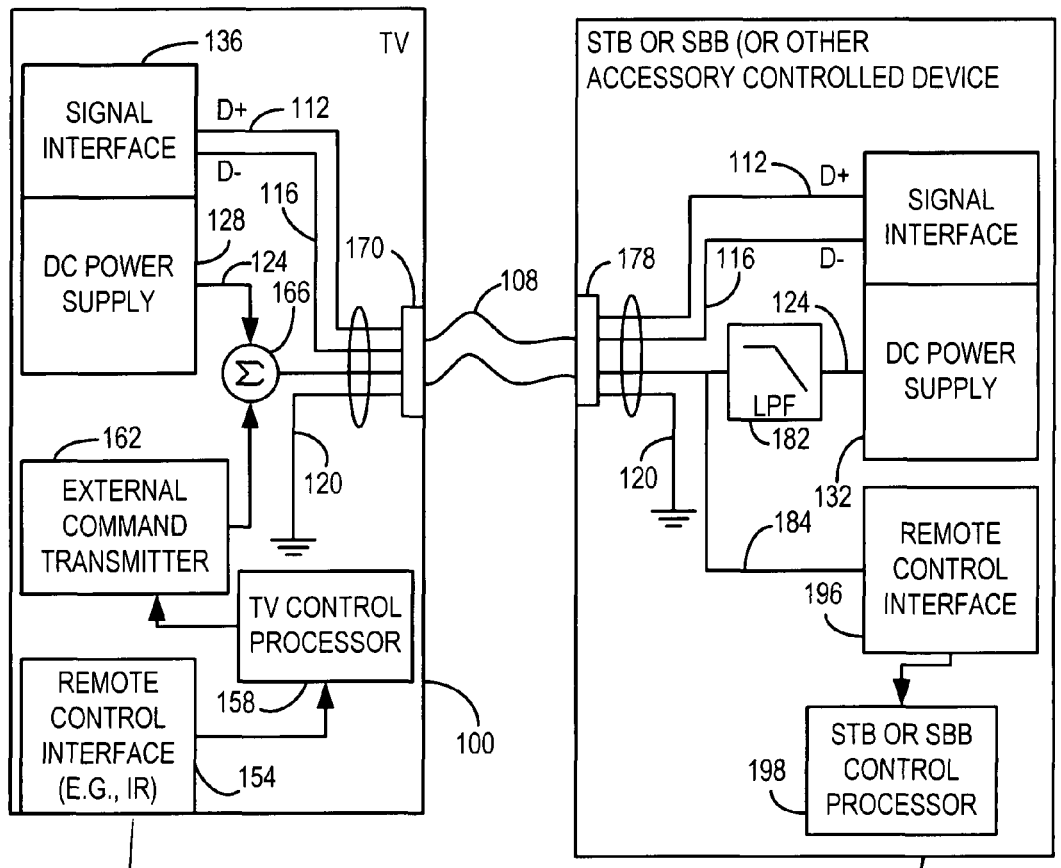
FIG. 1 is a block diagram of an exemplary remote command system consistent with certain embodiments of the present invention.
Figure 1:
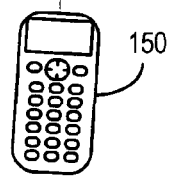

While this invention is susceptible of embodiment in many different forms, there is shown in the drawings and will herein be described in detail specific embodiments, with the understanding that the present disclosure of such embodiments is to be considered as an example of the principles and not intended to limit the invention to the specific embodiments shown and described. In the description below, like reference numerals are used to describe the same, similar or corresponding parts in the several views of the drawings.

The terms "a" or "an", as used herein, are defined as one or more than one. The term "plurality", as used herein, is defined as two or more than two. The term "another", as used herein, is defined as at least a second or more. The terms "including" and/or "having", as used herein, are defined as comprising (i.e., open language). The term "coupled", as used herein, is defined as connected, although not necessarily directly, and not necessarily mechanically. The term "program" or "computer program" or similar terms, as used herein, is defined as a sequence of instructions designed for execution on a computer system. A "program", or "computer program", may include a subroutine, a function, a procedure, an object method, an object implementation, in an executable application, an applet, a servlet, a source code, an object code, a shared library/dynamic load library and/or other sequence of instructions designed for execution on a computer system.

The term "program", as used herein, may also be used in a second context (the above definition being for the first context). In the second context, the term is used in the sense of a "television program". In this context, the term is used to mean any coherent sequence of audio video content such as those which would be interpreted as and reported in an electronic program guide (EPG) as a single television program, without regard for whether the content is a movie, sporting event, segment of a multi-part series, news broadcast, etc. The term may also be interpreted to encompass commercial spots and other program-like content which may not be reported as a program in an electronic program guide.

Reference throughout this document to "one embodiment", "certain embodiments", "an embodiment" or similar terms means that a particular feature, structure, or characteristic described in connection with the embodiment is included in at least one embodiment of the present invention. Thus, the appearances of such phrases or in various places throughout this specification are not necessarily all referring to the same embodiment. Furthermore, the particular features, structures, or characteristics may be combined in any suitable manner in one or more embodiments without limitation.

The term "or" as used herein is to be interpreted as an inclusive or meaning any one or any combination. Therefore, "A, B or C" means "any of the following: A; B; C; A and B; A and C; B and C; A, B and C". An exception to this definition will occur only when a combination of elements, functions, steps or acts are in some way inherently mutually exclusive.

The term "processor", "controller", "CPU", "Computer" and the like as used herein encompasses both hard programmed, special purpose, general purpose and programmable devices and may encompass a plurality of such devices or a single device in either a distributed or centralized configuration without limitation.

For purposes of this document, the terms STB and SBB are considered interchangeable and are intended to embrace any television accessory device including cable or satellite converter boxes or adapters as well as video recording devices and the like that it would be desirable to control with a single remote controller.

In a home entertainment scenario were there is a display unit, the display unit is generally visible to the user. Hence, the remote controller held by the user would be visible to the remote control signal detector in the TV. However, that may not be the case with the set back box or set top box which may not have a clear field of view to the user, and in some cases may be desirably hidden from view for aesthetic purposes.

Turning now to FIG. 1, a block diagram of a system for controlling a remote device such as a STB or SBB or the like using a television remote controller is depicted. In this embodiment, a TV 100 is connected to the STB or SBB 104 (purely by way of example) via a cable such as a standard USB (Universal Serial Bus) cable or HDMI (High Definition Multimedia Interface) cable connection 108, for example. Other interconnections are also possible including Apple Corporation's FireWire® branded IEEE 1394 serial bus technologies and other yet to be determined standards. In the present example, consider the connection to be a USB connection for ease of discussion, but the invention should not be considered limited as such.

In a USB connection, four conductors are conventionally used—two data connections D+ and D− illustrated as 112 and 116 along with a ground connection 120 and a DC power connection 124. A similar set of conductors are often utilized in other connection systems. Conventionally, in a USB arrangement, power can be supplied by multiple DC power sources that can be connected together such as DC power supply 128 in TV 100 and 132 in SBB 104. In other cases, only one of the devices may incorporate a power supply and may rely upon the other device for the supply of DC power. Multiple such USB connections can often be made to a single USB hub, and the DC power supplied may be shared by multiple devices or shared by several devices. Hence, the illustration provided in FIG. 1 should be considered but one scenario. In this scenario, both devices 100 and 104 have their own power supplies, but one could easily consider either of the power supplies 128 or 132 to be simply a junction for receipt of incoming DC power from the other device without limitation.

Normal data communication takes place between two USB devices (by way of example) by use of the D+ and D− signal lines 112 and 116. In this manner, various data communication functions can be carried out between signal interfaces 136 and 140.

In accordance with embodiments consistent with the present invention, control signals between the TV 100 and the SBB 104 via the USB connection are not used for passing through signals generated by a remote control such as infrared remote control 150. Or, if such signals are generally carried by the USB connection in a conventional manner, the communication may be limited to an abbreviated command set. For example, the USB connection may be used to interconnect digital recording devices present in the SBB or similar device.

Such remote controls as 150 produce coded infrared light pulses that are directed toward the television device 100, which is always presumed to be situated such that a viewer with a remote control can direct control beams of IR light to the television 100. Such IR signals are received by the remote control interface 154 of TV 100 where they are received and converted to electrical signals that can be interpreted by the TV's control processor 158 (or other circuitry that controls operation of functional aspects of the TV 100). In a conventional mode of operation, if the command is one that can be executed directly by the television 100 itself, the TV control processor 158 causes such action to be carried out (for example, change of volume).

However, other functions may only be carried out by a remote attached device such as the STB or SBB or similar connected device. In this case, the TV control processor 158 determines that the command cannot be internally processed, and passes the command to an external command processor 162. The external command processor converts the command to an electrical signal suitable for modulation on the DC power supply line 124 and such signal is then modulated onto the DC power supply line 124 (depicted as a summing operation at 166). The signal is then carried across the USB (or similar) connector 170, through cable 108, and into connector 174 of the device to which the command is directed. In the case of multiple connections, the command may be broadcast with or without a destination address.

At the SBB 104, the modulated command signal is filtered out, for example using a low-pass filter 182 to reproduce a clean DC power signal for use at 132 (if 132 is the recipient of power) or combined with power generated at 132 (if DC power is being sourced from 132).

Figure 2:
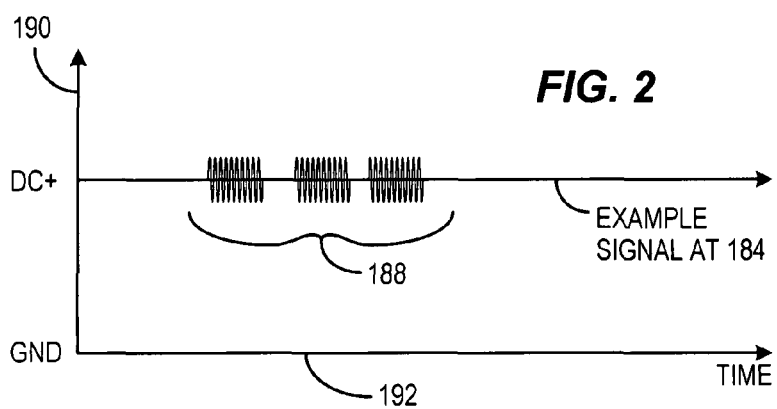
FIG. 2 illustrates the signaling used in an embodiment consistent with certain embodiments of the present invention.

Thus, the signal at line 124 contains only the DC supply, whereas the output of 166, shown as 184, contains the DC power supply signal having a modulated signal appearing as a part thereof. FIG. 2 depicts voltage level on the vertical axis 190 and time on the horizontal axis 192 with the normal DC voltage supplied at 124 being shown as DC+ on the vertical axis. By way of illustration, without limitation, FIG. 2 illustrates a burst of modulation at area 188 of signal 184.

The signal modulated to the DC power supply line can be formatted in any suitable format including packetized communication or simple broadcast commands. Additionally, the signal can be modulated onto the DC power supply line in any suitable way including frequency modulation, amplitude modulation, pulse modulation, or any other suitable form of modulation, however, it is most preferable that the short and long term average value of the DC power supply signal remain constant so as not to disrupt use of the DC power supply line for its intended purpose of supplying power. It is also desirable to deviate from the power supply's quiescent value by a minimum amount necessary to achieve a suitable signal to noise ratio at the device receiving the communication.

Returning to FIG. 1, the signal at 184 is received by the SBB's remote control interface 196 which separates the modulated signaling from the DC signal at 184 (e.g., by capacitive coupling) and demodulates the signal to produce a digital code that can be equated to a command from the remote controller 150. This command is then passed to the SBB or STB's control processor 198 or other circuitry that implements the command originating from the remote controller 150.

While the present embodiment depicts using the remote control to directly control the STB or SBB 104 via the DC power supply communication arrangement described, one can readily envision that the communication is transmitted via the DC power supply as shown to a so called "IR Blaster" which regenerates appropriate IR control signals for the target device and thus serves as an intermediary. Additionally, while the TV has been considered the master for purposes of the illustrative example, the TV could also be configured as the accessory device without limitation. Other variations will occur to those skilled in the art upon consideration of the present teachings.

Thus, in accordance with certain embodiments, a television set having remote control signaling to a controlled device has a data communication interface for communication of data, the data communication interface having a connection reserved for DC power. A remote control interface receives commands from a remote control device. A circuit such as a processor or a hardware device determines whether a command received at the remote control interface is destined for the television set or for the controlled device. The controlled device is connected to the television set via the data communication interface. A modulator modulates a signal representing a command destined for the controlled device onto the DC power connection in order to convey the command to the controlled device.

In certain embodiments, the controlled device can be at least one of a television set top box and a television set back box. In certain embodiments, the data communication interface can be a universal serial bus (USB) compliant interface and a high-definition multimedia interface (HDMI) compliant interface or other accessory device. In certain embodiments, the remote control interface comprises an infrared remote control interface.

In another embodiment, a television accessory device that is interconnected to and controllable by the television has a data communication interface for communication of data, the data communication interface having a connection reserved for DC power. The accessory device is connected to the television via the data communication interface. A demodulator is coupled to the DC power connection to demodulate a signal representing a command that is modulated onto the DC power connection in order to receive a command from the television. A processor implements the command in the accessory device.

In certain embodiments, the accessory device comprises one of a television set top box and a television set back box. In certain embodiments, the data communication interface can be a universal serial bus (USB) compliant interface and a high-definition multimedia interface (HDMI) compliant interface. In certain embodiments, the command originates at an infrared remote control.

Figure 3:
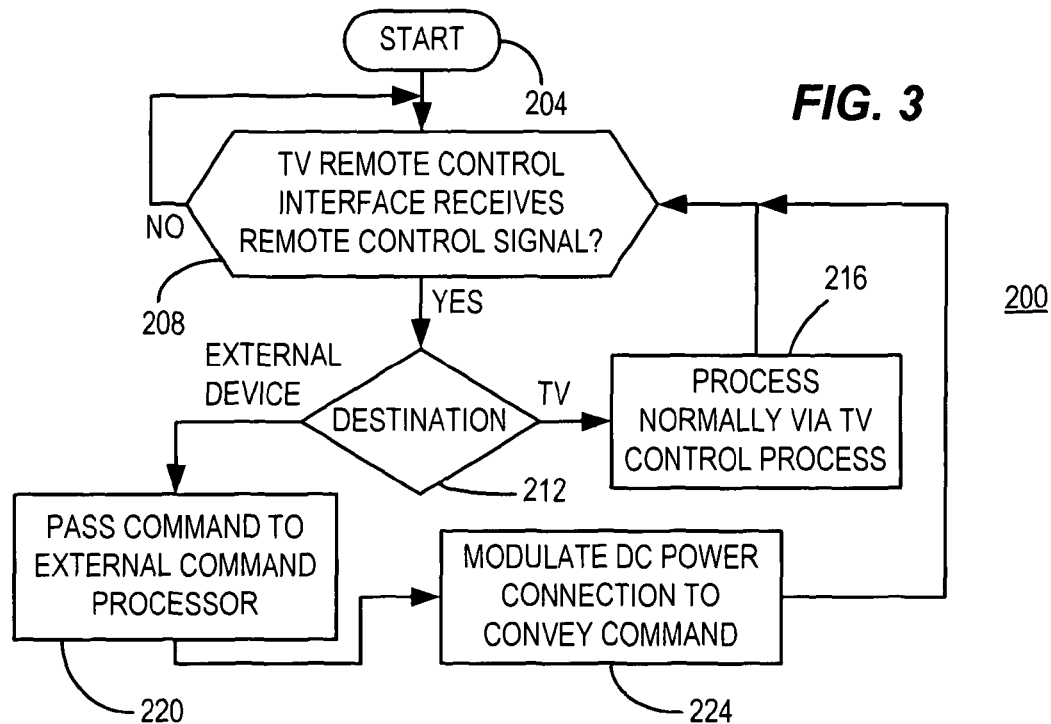
FIG. 3 is a flow chart depicting an exemplary process carried out in a television device in a manner consistent with certain embodiments of the present invention.
Figure 4:
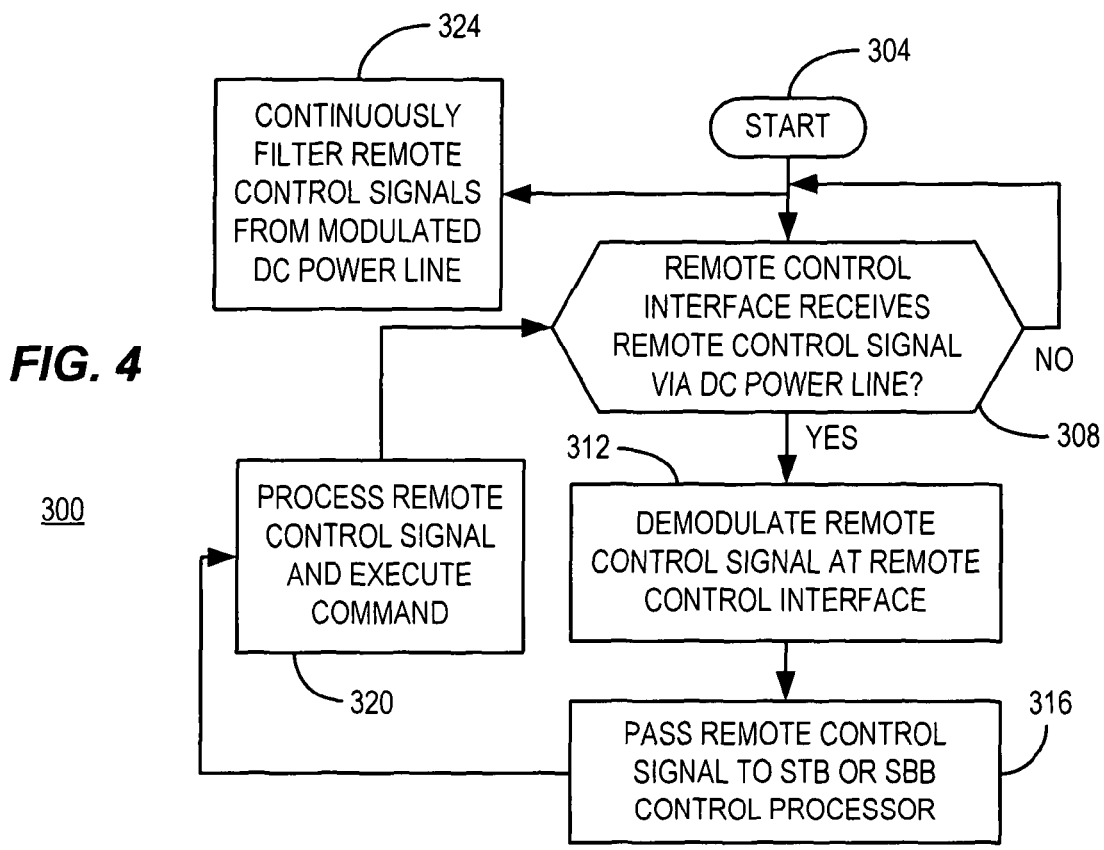
FIG. 4 is a flow chart depicting an exemplary process carried out on a controlled device such as a set top box or set back box in a manner consistent with certain embodiments of the present invention.

The processes just described in terms of the functional blocks of FIG. 1 can be executed using programmed processors or hardware devices functioning in accord with the flow charts 200 and 300 of FIGS. 3 and 4 as described below. Process 200 starts at 204 after which the TV's remote control interface 154 looks for signals from remote control 150 at 208, and when a remote control signal is received at 208, a determination is made at the TV control processor 158 whether or not the command is destined for the TV or a connected accessory device such as the SBB or STB 100 at 212. If the command is destined for the TV, the command is processed in a normal manner at 216, and control returns to 208. If the command is for the connected accessory, the command is passed to the external command processor at 220 where the command is converted to a modulated signal that is sent to the accessory device by way of modulating the signal onto the DC power supply line in order to convey the command at 224. Control then returns to 208.

Process 300 is carried out at the accessory device starting at 304 wherein the remote control interface 196 monitors the DC power supply line of the interface at 308 to determine if a command is being received as a modulated signal to the DC power supply line. If so, control passes to 312 where the remote control signal is separated from the DC and demodulated. Once demodulated, the remote control signal is passed on to hardware such as a control processor at 316 that implements the command at 320, after which control returns to 308 to await the next command. At 324, the DC power may be continuously filtered to remove remote control commands so that the power, if used as a DC power source, remains clean and usable for its intended purpose.

Any suitable modulation scheme may be used for modulation of the remote control signal onto the DC power supply line. Since most modulated infrared remote control signals are originally modulated at an infrared carrier of between approximately 38-40 kHz, this modulation could conveniently be directly used to produce the modulated electrical signal added to the DC power supply line. However, any suitable carrier range could be used. Other choices may be equally advantageous including 13.5 MHz which is used for RF light bulbs and contactless cards. Since the FCC does not do electrical emissions testing below 30 MHz, a frequency up to 30 MHz also has advantages. These frequency ranges should not be considered limiting however as any suitable modulation arrangement and carrier frequency can be used.

While the present embodiments depict a TV as a master device for the present invention which receives and relays commands to an accessory device, it is possible to implement embodiments consistent with the present invention with any suitable device serving as a master which receives the IR commands and conveys them to an accessory device by way of modulating control signals onto the DC signal line of an interface such as a USB or HDMI interface without limitation.

Thus, a method of communicating from a television device to an accessory device connected by a data communication interface involves receiving a command from a remote control device via a remote control interface; converting the command to an electrical signal; providing the data communication interface for communication of data, said data communication interface having a connection reserved for DC power; and modulating the electrical signal onto the DC power connection of said interface to convey the command to the accessory device.

In certain embodiments, the method further involves determining whether the command received from the remote control device is destined for the television device or for the accessory device; and carrying out an action associated with the command at the television device if the command received from the remote control device is destined for the television device. In certain embodiments, the accessory device comprises at least one of a television set, television set top box and a television set back box. In certain embodiments, the data communication interface comprises one of a universal serial bus (USB) compliant interface and a high-definition multimedia interface (HDMI) compliant interface. In certain embodiments, the remote control interface comprises an infrared remote control interface.

In accordance with other embodiments, a method of receiving commands at a television device involves providing a data communication interface for communication of data, said data communication interface having a connection reserved for DC power; receiving a modulated signal over the DC power connection of the data communication interface; demodulating the modulated signal received over the DC power connection tp recover a signal representing a command; and executing the command.

In certain embodiments, the television device comprises one of a television set top box and a television set back box. In certain embodiments, the data communication interface comprises one of a universal serial bus (USB) compliant interface and a high-definition multimedia interface (HDMI) compliant interface. In certain embodiments, the command originated at an infrared remote control. Any of these processes can be implemented using a programmed processor executing instructions stored on a computer readable storage medium.

Any of the above embodiments can be carried out at a carrier frequency less than approximately 30 MHz. In certain embodiments the carrier frequency can be approximately 13.5 MHz. In certain other embodiments, the carrier frequency can be approximately 38 to 40 KHz.

It will be clear upon consideration of the above, that there is an assumption that there is an interface such as USB between the TV and accessory device. This interface could be used to convey the STB's remote control signals. On both HDMI and USB interfaces, there is a 5V DC power line. In both interfaces the power line is filtered to eliminate any noise if present. But, here this DC power line is used to convey data such as IR commands. With the simple addition of a filter to block the data signal from going into the power supply of the DC circuit and a capacitor to couple the data into the DC line, dual usage of the power line can be made. In other words the remote control signal is superimposed upon the DC power line. This provides a way of communicating remote controller commands to a remote networked appliance by utilizing the DC power line in a USB, or HDMI connection. The idea may be extended to include LAN/Ethernet without departing from embodiments consistent with the present invention.

Those skilled in the art will recognize, upon consideration of the above teachings, that certain of the above exemplary embodiments are based upon use of one or more programmed processors, computers or other programmable devices. However, the invention is not limited to such exemplary embodiments, since other embodiments could be implemented using hardware component equivalents such as special purpose hardware and/or dedicated processors. Similarly, general purpose computers, microprocessor based computers, microcontrollers, optical computers, analog computers, dedicated processors, application specific circuits and/or dedicated hard wired logic may be used to construct alternative equivalent embodiments.

Certain embodiments described herein, are or may be implemented using one or more programmed processors (e.g., processors 158 and 198) executing programming instructions that are broadly described above in flow chart form that can be stored on any suitable electronic or computer readable storage medium and/or can be transmitted over any suitable electronic communication medium. However, those skilled in the art will appreciate, upon consideration of the present teaching, that the processes described above can be implemented in any number of variations and in many suitable programming languages without departing from embodiments of the present invention. For example, the order of certain operations carried out can often be varied, additional operations can be added or operations can be deleted without departing from certain embodiments of the invention. Error trapping can be added and/or enhanced and variations can be made in user interface and information presentation without departing from certain embodiments of the present invention. Such variations are contemplated and considered equivalent.

While certain embodiments herein were described in conjunction with specific circuitry that carries out the functions described, other embodiments are contemplated in which the circuit functions are carried out using equivalent software or firmware embodiments executed on one or more programmed processors. General purpose computers, microprocessor based computers, micro-controllers, optical computers, analog computers, dedicated processors, application specific circuits and/or dedicated hard wired logic, analog circuitry, pluralities of such devices and combinations of such devices in centralized or distributed configurations may be used to construct alternative equivalent embodiments. Other embodiments could be implemented using hardware component equivalents such as special purpose hardware and/or dedicated processors.

While certain illustrative embodiments have been described, it is evident that many alternatives, modifications, permutations and variations will become apparent to those skilled in the art in light of the foregoing description.

What is claimed is:

1. A television set having remote control signaling to a controlled device, comprising:
   a data communication interface for communication of data, said data communication interface having a connection reserved for DC power and having at least one separate connection reserved for data;
   a remote control interface that receives commands from a remote control device;
   a circuit that determines whether a command received at the remote control interface is destined for the television set or for the controlled device;
   wherein the controlled device is connected to the television set via the data communication interface; and
   a modulator that modulates a signal representing a command destined for the controlled device onto the DC power connection in order to convey the command to the controlled device.

2. The television set according to claim 1, wherein the controlled device comprises at least one of a television set top box and a television set back box.

3. The television set according to claim 1, wherein the data communication interface comprises one of a universal serial bus (USB) compliant interface and a high-definition multimedia interface (HDMI) compliant interface.

4. The television set according to claim 1, wherein the remote control interface comprises an infrared remote control interface.

5. The television set according to claim 1, wherein the modulator modulates at a carrier frequency less than approximately 30 MHz.

6. The television set according to claim 5, wherein the modulator modulates at a carrier frequency of approximately 13.5 MHz.

7. The television set according to claim 5, wherein the modulator modulates at a carrier frequency of approximately 38 to 40 KHz.

8. A television set having remote control signaling to a connected device including one of set back box or set top box, comprising:
   a data communication interface for communication of data, said data communication interface having a connection reserved for DC power;
   an infrared remote control interface that receives commands from a remote control device;
   a circuit that determines whether a command received at the remote control interface is destined for the television set or for the connected device;
   wherein the connected device is connected to the television set via the data communication interface;
   a modulator that modulates a signal with a carrier of less than approximately 30 MHz representing a command destined for the connected device onto the DC power connection in order to convey the command to the connected device; and
   wherein the data communication interface comprises one of a universal serial bus (USB) compliant interface and a high-definition multimedia interface (HDMI) compliant interface.

9. A television accessory device that is interconnected to and controllable by the television, comprising:
   a data communication interface for communication of data, said data communication interface having a connection reserved for DC power;
   wherein the accessory device is connected to the television via the data communication interface;
   a demodulator, coupled to the DC power connection that demodulates a signal representing a command that is modulated onto the DC power connection in order to receive a command from the television; and
   a processor that implements the command in the accessory device.

10. The television accessory device according to claim 9, wherein the accessory device comprises one of a television set top box and a television set back box.

11. The television accessory device according to claim 9, wherein the data communication interface comprises one of a universal serial bus (USB) compliant interface and a high-definition multimedia interface (HDMI) compliant interface.

12. The television accessory device according to claim 9, wherein the command originated at an infrared remote control.

13. The television accessory according to claim 9, wherein the demodulator demodulates a carrier frequency less than approximately 30 MHz.

14. The television accessory according to claim 9, wherein the demodulator demodulates a carrier frequency of approximately 13.5 MHz.

15. The television accessory according to claim 9, wherein the demodulator demodulates a carrier frequency of approximately 38 to 40 KHz.

16. A television accessory device that is interconnected to and controllable by the television, comprising:
   a data communication interface for communication of data, said data communication interface having a connection reserved for DC power;
   wherein the data communication interface comprises one of a universal serial bus (USB) compliant interface and a high-definition multimedia interface (HDMI) compliant interface;
   wherein the accessory device is connected to the television via the data communication interface;
   a demodulator, coupled to the DC power connection that demodulates a signal with a carrier frequency of less than approximately 30 MHz representing a command that is modulated onto the DC power connection in order to receive a command from the television;
   a processor that implements the command in the accessory device; and
   wherein the accessory device comprises one of a television set top box and a television set back box.

17. The television accessory device according to claim 16, wherein the command originated at an infrared remote control.

18. A method of communication between a television device and an accessory device connected by a data communication interface, comprising:
   receiving a command from a remote control device via a remote control interface;
   converting the command to an electrical signal;
   providing the data communication interface for communication of data, said data communication interface having a connection reserved for DC power; and
   modulating the electrical signal onto the DC power connection of said interface to convey the command to the accessory device.

19. The method according to claim 18, further comprising:
   determining whether the command received from the remote control device is destined for the television device or for the accessory device; and
   carrying out an action associated with the command at the television device if the command received from the remote control device is destined for the television device.

20. The method set according to claim 18, wherein the accessory device comprises at least one of a television set, television set top box and a television set back box.

21. The method according to claim 18, wherein the data communication interface comprises one of a universal serial bus (USB) compliant interface and a high-definition multimedia interface (HDMI) compliant interface.

22. The method according to claim 18, wherein the remote control interface comprises an infrared remote control interface.

23. The method according to claim 18, wherein the modulating is carried out at a carrier frequency less than approximately 30 MHz.

24. The method according to claim 18, wherein the modulating is carried out at a carrier frequency of approximately 13.5 MHz.

25. The method according to claim 18, wherein the modulating is carried out at a carrier frequency of approximately 38 to 40 KHz.

26. A non-transitory computer readable storage medium storing instructions which, when executed on one or more programmed processors, carry out a method of communication between a television device and an accessory device connected by a data communication interface, comprising:
   receiving a command from a remote control device via a remote control interface;
   converting the command to an electrical signal;
   providing the data communication interface for communication of data, said data communication interface having a connection reserved for DC power; and
   modulating the electrical signal onto the DC power connection of said interface to convey the command to the accessory device.

27. A method of receiving commands at a television device, comprising:
   providing a data communication interface for communication of data, said data communication interface having a connection reserved for DC power;
   receiving a modulated signal over the DC power connection of the data communication interface;
   demodulating the modulated signal received over the DC power connection to recover a signal representing a command; and
   executing the command.

28. The method according to claim 27 wherein the television device comprises one of a television set top box and a television set back box.

29. The method according to claim 27, wherein the data communication interface comprises one of a universal serial bus (USB) compliant interface and a high-definition multimedia interface (HDMI) compliant interface.

30. The method according to claim 27, wherein the command originated at an infrared remote control.

31. The method according to claim 27, wherein the demodulating is carried out at a carrier frequency less than approximately 30 MHz.

32. The method according to claim 27, wherein the demodulating is carried out at a carrier frequency of approximately 13.5 MHz.

33. The method according to claim 27, wherein the demodulating is carried out at a carrier frequency of approximately 38 to 40 KHz.

34. A non-transitory computer readable storage medium storing instructions which, when executed on one or more programmed processors, carry out a method of receiving commands at a television device, comprising:
   providing a data communication interface for communication of data, said data communication interface having a connection reserved for DC power;
   receiving a modulated signal over the DC power connection of the data communication interface;

demodulating the modulated signal received over the DC power connection to recover a signal representing a command; and executing the command.

* * * * *